US006866133B2

(12) United States Patent
Weidinger

(10) Patent No.: US 6,866,133 B2
(45) Date of Patent: Mar. 15, 2005

(54) PRESSURE PLATE ASSEMBLY FOR A FRICTION CLUTCH

(75) Inventor: Reinhold Weidinger, Unterspiesheim (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/676,196

(22) Filed: Oct. 1, 2003

(65) Prior Publication Data

US 2004/0069587 A1 Apr. 15, 2004

(30) Foreign Application Priority Data

Oct. 9, 2002 (DE) .......................................... 102 47 013

(51) Int. Cl.[7] .............................................. F16D 13/75
(52) U.S. Cl. .................................. 192/111 A; 192/70.25
(58) Field of Search ........................... 192/70.25, 111 A

(56) References Cited

U.S. PATENT DOCUMENTS 2,241,223 A * 5/1941 Spase et al. ............. 192/111 A
2,774,452 A    2/1956 Wisman
5,641,048 A * 6/1997 von Gaisberg ........... 192/70.25
6,460,676 B1 * 10/2002 Young ..................... 192/70.25
6,533,094 B2 * 3/2003 Uehara et al. ........... 192/70.25
2004/0079607 A1 * 4/2004 Osman et al. ........... 192/70.25

FOREIGN PATENT DOCUMENTS

DE     19816519 C1 * 1/2000 ........... F16D/13/75
DE     101 55 146     9/2002

* cited by examiner

Primary Examiner—Richard M. Lorence
(74) Attorney, Agent, or Firm—Cohen, Pontani, Lieberman & Pavane

(57) ABSTRACT

A pressure plate assembly for a friction clutch comprises a housing arrangement; a pressure plate, which is inside the housing arrangement and which can rotate along with it around an axis of rotation; a force-exerting arrangement, preferably a force-storing device, supported against the housing arrangement and the pressure plate; and a wear take-up device in the path of force transmission between the force-exerting arrangement and the pressure plate. At least one wear take-up element can be moved in order to compensate for wear, and an adjusting element is able to make an adjusting movement which causes the minimum of one wear take-up element to move and thus to compensate for wear, where the adjusting element can be caused to execute its adjusting movement by the action of centrifugal force.

19 Claims, 12 Drawing Sheets

PRESSURE PLATE ASSEMBLY FOR A FRICTION CLUTCH

BACKGROUND OF THE INVENTION

1. Field of the Invention

The present invention pertains to a pressure plate assembly for a friction clutch comprising a housing arrangement; a pressure plate which is inside the housing arrangement and which can rotate with it around an axis of rotation; a force-exerting arrangement, preferably a force-storing device, which can be supported against the housing arrangement and the pressure plate; and a wear take-up device in the path of force transmission between the force-exerting arrangement and the pressure plate, comprising at least one wear take-up element which can be moved to compensate for wear.

2. Description of the Related Art

In pressure plate assemblies in which the wear take-up device acts automatically to compensate for wear, the minimum of one wear take-up element is pretensioned by some type of pretensioning device, usually a pretensioning spring, which tries to push the element in a certain direction. After a blocking action has been released, the wear take-up element is free to move in this direction, and under certain conditions it can then compensate for the wear which has occurred. To ensure that the pretension on the wear take-up element can cause the element to carry out its wear take-up function only under certain conditions, measures must be taken to prevent the minimum of one wear take-up element from shifting its position relative to the pressure plate during those phases in which no wear take-up is supposed to occur. For this purpose it is known, for example, that leaf spring elements can be used, which can serve to detect the wear or the occurrence of wear, but which also have the function of ensuring through their elastic pretension that the wear take-up element does not shift position before any wear has occurred or after compensation has been made for previous wear. The opposing force provided by an element of this type, such as a leaf spring element, must be sufficiently strong to oppose the pretensioning force acting on the minimum of one take-up element even when, for example, vibrations occur in the system. Especially when this type of element is simultaneously fulfilling the function of a wear detection element, however, providing it with a sufficient degree of stiffness can impair the wear-detecting behavior and possibly even the overall behavior of the clutch.

SUMMARY OF THE INVENTION

It is the object of the present invention to provide a pressure plate assembly for a friction clutch in which the presence of an automatically acting wear take-up function does not produce any disadvantageous effects on the behavior of the clutch.

According to the invention, an adjusting element is assigned to the at least one wear take-up element, which adjusting element is able to make an adjusting movement which causes the at least one wear take-up element to move and thus to compensate for wear, where the adjusting element can execute its adjusting movement by the action of centrifugal force.

In the pressure plate assembly according to the invention, therefore, no permanent pretension is exerted on the wear take-up element to cause it to execute a wear take-up movement. Instead, when a wear take-up process or a wear compensation process is to occur, centrifugal force causes the adjusting element to perform the adjusting movement, and as this adjusting element performs its adjusting movement, it drives the assigned wear take-up element and thus ensures that a previously detected wear is compensated.

In order to guarantee a secure and reliable interaction between the minimum of one wear take-up element and the adjusting element assigned to it, it is proposed that the adjusting element have a set of adjusting teeth, which, to execute a wear take-up process, mesh with an opposing set of adjusting teeth on the assigned wear take-up element or on an element connected to the wear take-up element provided to transmit the adjusting force. So that the adjusting element can return repeatedly to a state from which it can execute the previously mentioned adjusting movement, it is provided that the adjusting teeth and the opposing adjusting teeth can be disengaged from each other.

In the pressure plate assembly according to the invention, it is preferable for the adjusting element to be supported on the pressure plate with freedom to pivot and to slide. As a result of this ability to pivot and to slide, it is possible for the adjusting teeth to mesh with the opposing set of adjusting teeth in the first end position of the sliding movement and for the set of adjusting teeth to be disengaged from the opposing set of adjusting teeth in the second end position of the sliding movement. It is possible, for example, for the adjusting element to be brought by the force of gravity and/or by the force of a spring from the first to the second end position of the sliding movement.

As previously mentioned, it is one of the goals of the present invention to ensure that, in general, there is no force present which could act on the wear take-up element in such a way as to cause it to execute an unwanted take-up movement; on the contrary, appropriate measures are taken and the corresponding forces are generated only when it is actually necessary to compensate for wear. To assist this process, it is proposed that an arresting device be provided, which allows the adjusting element to move from the first sliding end position to the second sliding end position only after wear has occurred. For this purpose, the arresting device can consist, for example, of an arresting section on the adjusting element. This arresting section can be released when wear occurs, but in the absence of wear or after a wear take-up process has occurred, it can be clamped by a clamping arrangement, in which state it arrests the adjusting element in the first sliding end position. This ensures that the adjusting element arrives in a state in which it can execute an adjusting movement under the action of centrifugal force and can thus cause the assigned wear take-up element to execute a wear take-up movement only when wear has actually occurred and has been detected.

In the pressure plate assembly according to the invention addition, furthermore, it can also be provided that the adjusting element can be brought from the second end position of the sliding movement to the first end position by the effect of centrifugal force.

So that the adjusting element can be brought into a state from which it can then execute the adjusting movement, the adjusting element can be pivoted into a pivot position which prepares it for an adjusting movement after it has slid into the second end position and/or while it is sliding into the second end position. It is preferable here for the adjusting element to be pivoted by the force of gravity and/or by the pretension of a spring into the pivot position which prepares it for the adjusting movement. Proceeding from this preparatory adjusting movement pivot position, the adjusting element can be pivoted by the action of centrifugal force in the direction of the final adjusting movement pivot position, in which it can then execute the adjusting movement. As this pivoting occurs, the adjusting element causes the assigned wear take-up element to execute the desired take-up movement.

So that it is possible to detect the wear which has occurred in the area of, for example, the friction linings of a clutch disk in a friction clutch in which a pressure plate assembly according to the invention has been provided, it is proposed that at least one wear detection element be provided on the pressure plate, at least certain areas of which detection element can shift position with respect to the pressure plate upon the occurrence of wear.

Because this wear detection element is therefore a component which executes a certain movement with respect to the pressure plate when wear actually occurs, it is possible in an advantageous elaboration of the invention for the wear detection element to form at least one part of the clamping arrangement. The wear detection element therefore serves a double function.

A blocking element can be assigned to the wear detection element; upon the occurrence of wear and the displacement of at least certain areas of the wear detection element with respect to the pressure plate, this blocking element prevents at least partially the wear detection element from moving backward relative to the pressure plate. For example, the blocking element can be designed as a wedge-shaped blocking slider. So that the simplest possible design can also be provided in this area, it is proposed that the element which transmits the adjusting force also forms the blocking element.

The pressure plate assembly according to the invention can be designed in such a way that the wear detection element detects the occurrence of wear through its interaction with a counter-detection area provided on the housing arrangement. As an alternative, it is possible for the wear detection element to detect wear through its interaction with a counter-detection area provided on the force-exerting arrangement.

The present invention also pertains to a friction clutch with a pressure plate assembly according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
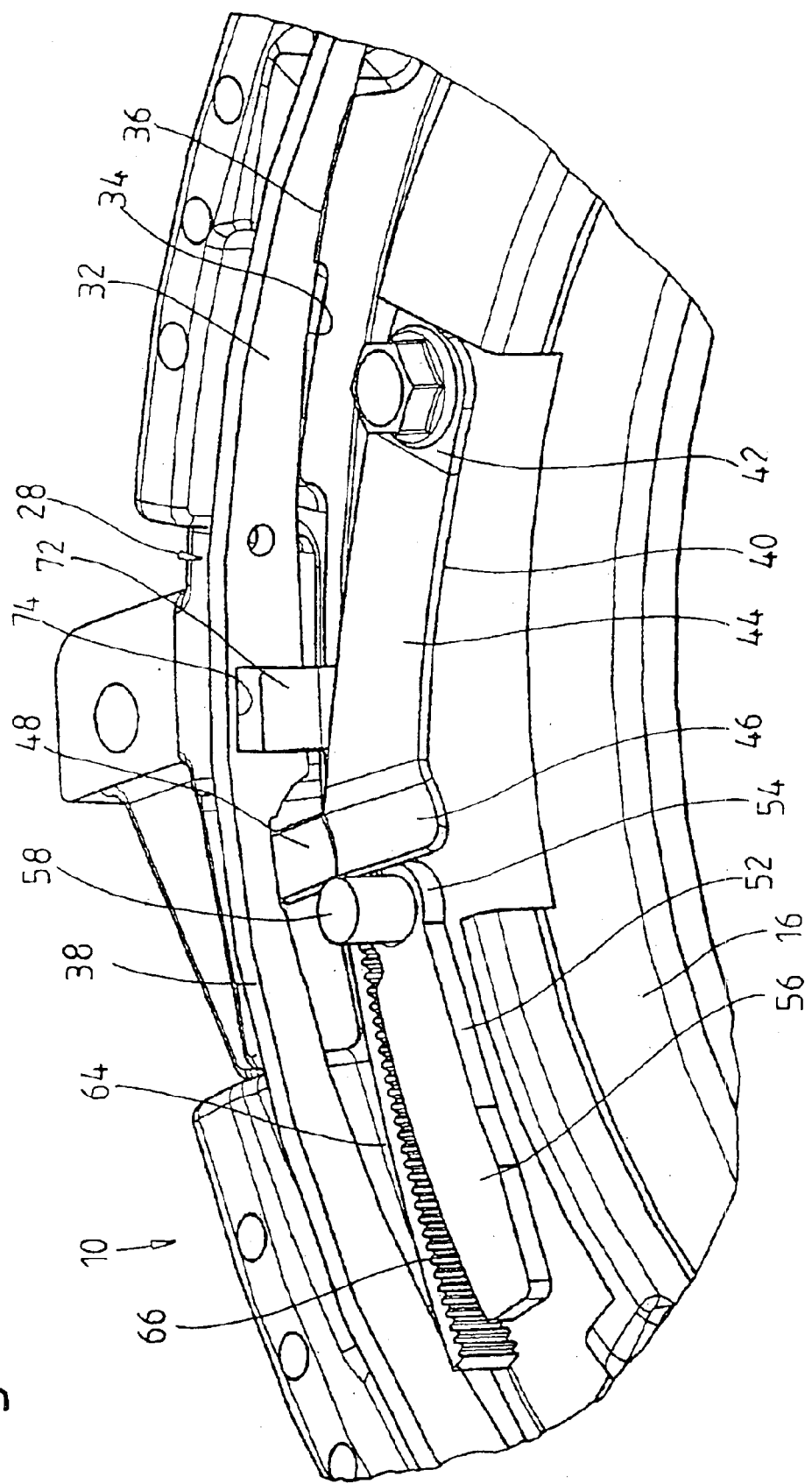
FIG. 1 shows a partial perspective view of the essential components of a pressure plate assembly according to the invention.

FIGS. 1–10 show a first embodiment of a pressure plate assembly according to the invention. The basic structure of this pressure plate assembly is explained below with reference to FIG. 3.

The pressure plate assembly 10 comprises a housing 12, which is designed essentially in the form of a cup, and which can be permanently connected by its axial end area 14 to a flywheel, such as a dual-mass flywheel. In the housing 12, a pressure plate 16 is provided, the radially outer area of which is connected by, for example, tangential leaf springs 18 or some other type of connecting devices to the housing 12 in an essentially nonrotatable fashion, but still with the freedom to move in a direction parallel to an axis of rotation. The pressure plate 16 makes available a friction surface 20. A force-storing device 22 forms a force-exerting arrangement, by means of which the pressure plate 16 can be caused to move toward the flywheel (not shown) to engage the clutch. In the example of a pull-type clutch shown here, the force-storing device 22 is supported by its radially outer area 24 against the housing 12, and the area 26 radially farther inward acts on the pressure plate 16 by way of a wear take-up device 28, which will be explained in greater detail below. A clutch-release mechanism can pull on the radially innermost area 30 of the force-storing device 22. It should be pointed out that it would also be possible, of course, to use a system of levers as the force-exerting arrangement, which transmits the clutch-engaging forces. In this case, the actuating forces required to press the pressure plate 16 toward the flywheel would be transmitted to the lever arrangement by a clutch-release mechanism.

In the case of the embodiment shown in FIG. 1, the essential component of the wear take-up device 28 is a wear take-up ring, which is essentially concentric to the axis of rotation. On its side facing the pressure plate, this ring has a plurality of wedge-like or ramp-like surfaces 34 arranged in a row around the circumference, which rest on corresponding opposing ramp-like surfaces 36 on the pressure plate 16. A rotation of the adjusting ring 32 relative to the pressure plate 16 has the result that the ramp surfaces 34 are displaced relative to the opposing ramp surfaces 36, and thus the side 38 of the adjusting ring 32 upon which the force-storing device 22 acts is shifted axially relative to the friction surface 20 of the pressure plate 16. It is thus possible in this way to compensate for a decrease in the thickness of the friction linings of the clutch disk (not shown).

A leaf spring-like wear detection element 40 is also provided on the pressure plate 16. This element is fastened at one circumferential end 42 to the pressure plate 16, and its body section 44 extends essentially in the circumferential direction along the inside surface of the adjusting ring 32. A detection section 48 formed at the other end 46 extends under the adjusting ring 32 and radially through to the other side, where it overlaps in the radial and circumferential directions a counter-detection element 50, which is fastened to the housing 12 by screws or similar fastening means. This counter-element is designed here, for example, as a plate 51. When, as a result of wear, the pressure plate 16 moves in the axial direction relative to the housing 12, the detection section 48 remains hanging on the counter-detection element 50, so that the detection element 40, or at least its end area 46, is moved axially relative to the pressure plate 16, namely, in the direction away from the pressure plate 16.

Figure 2:
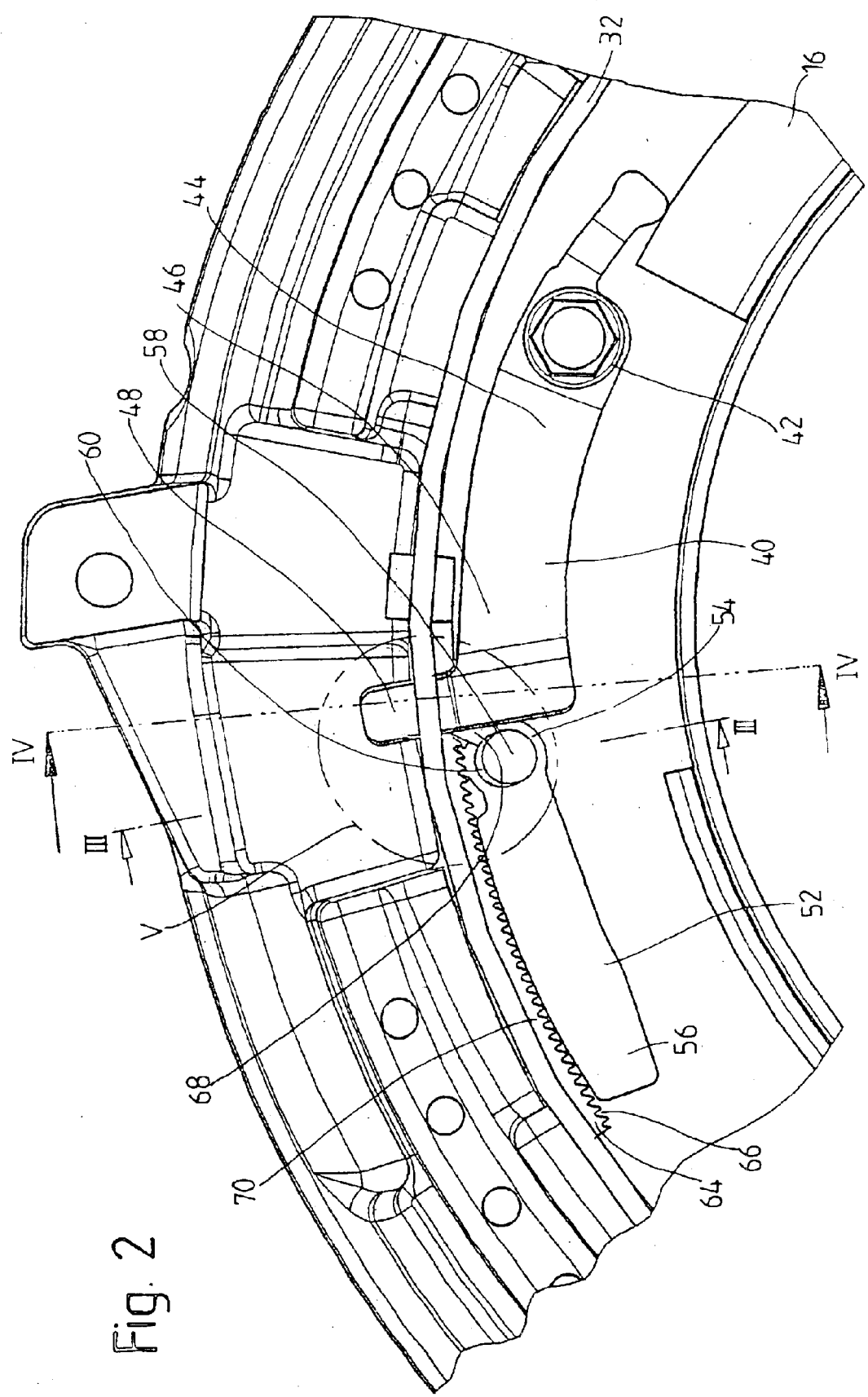
FIG. 2 shows an axial view of the arrangement shown in FIG. 1.
Figure 3:
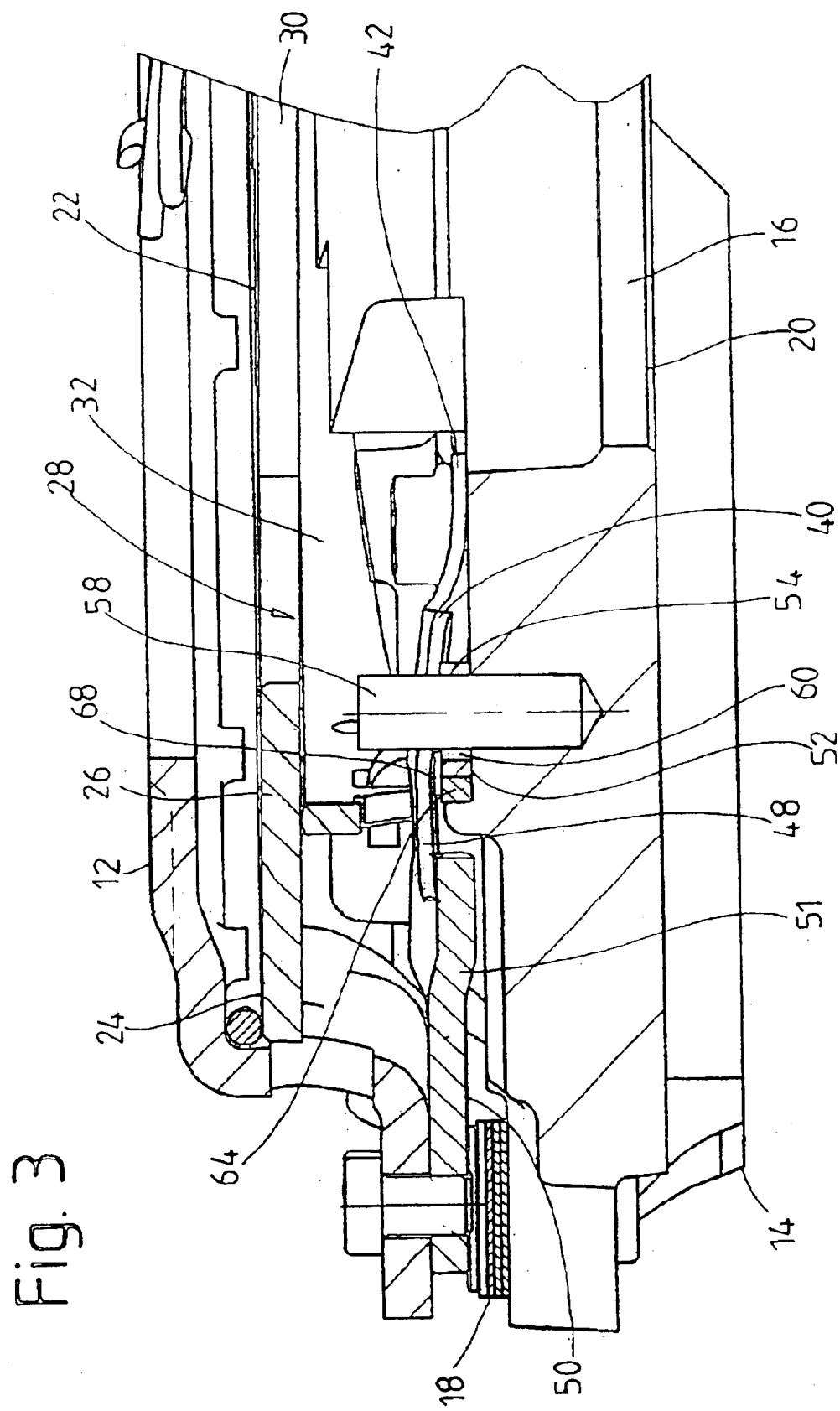
FIG. 3 shows a cross-sectional view of a pressure plate with the arrangement shown in FIGS. 1 and 2, taken along line III—III in FIG. 2.
Figure 4:
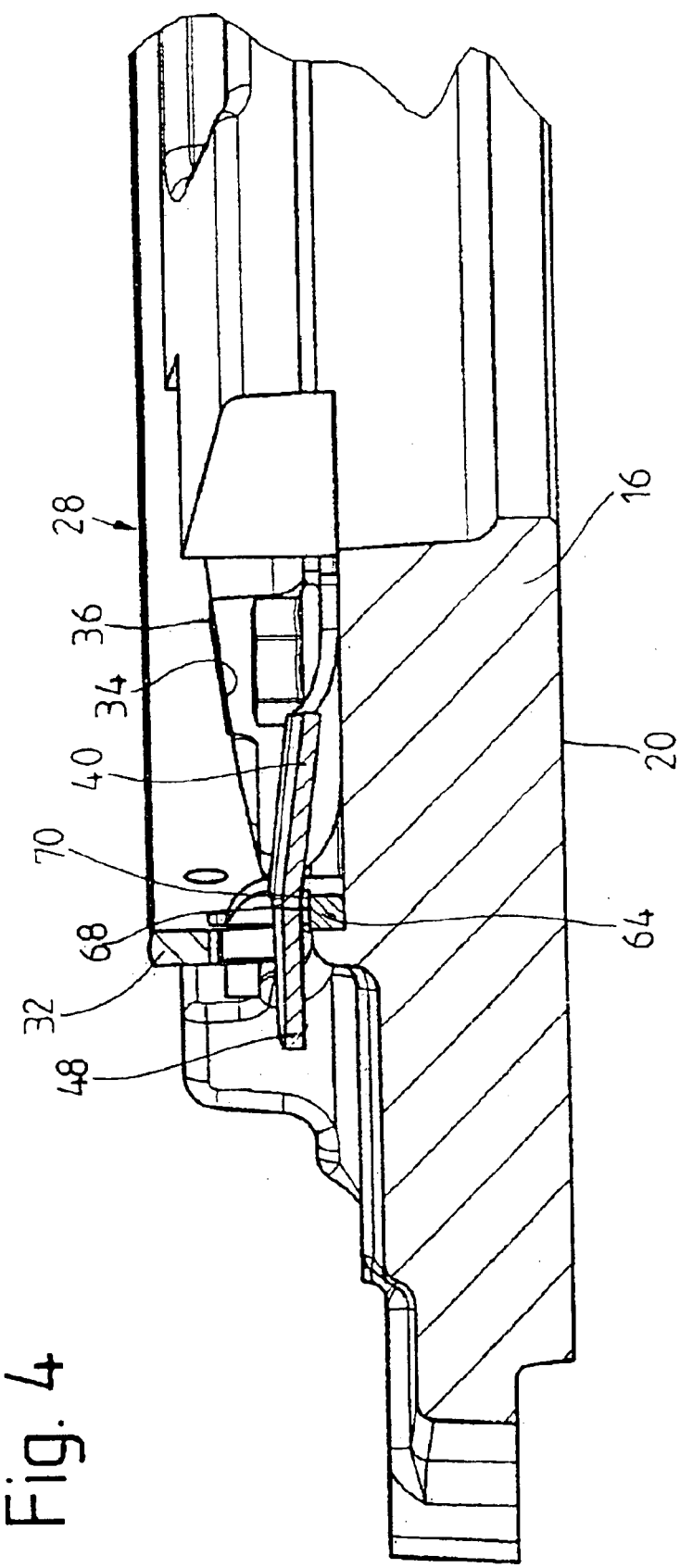
FIG. 4 shows a cross-sectional view of the arrangement shown in FIGS. 1 and 2, taken along line IV—IV in FIG. 2.
Figure 5:
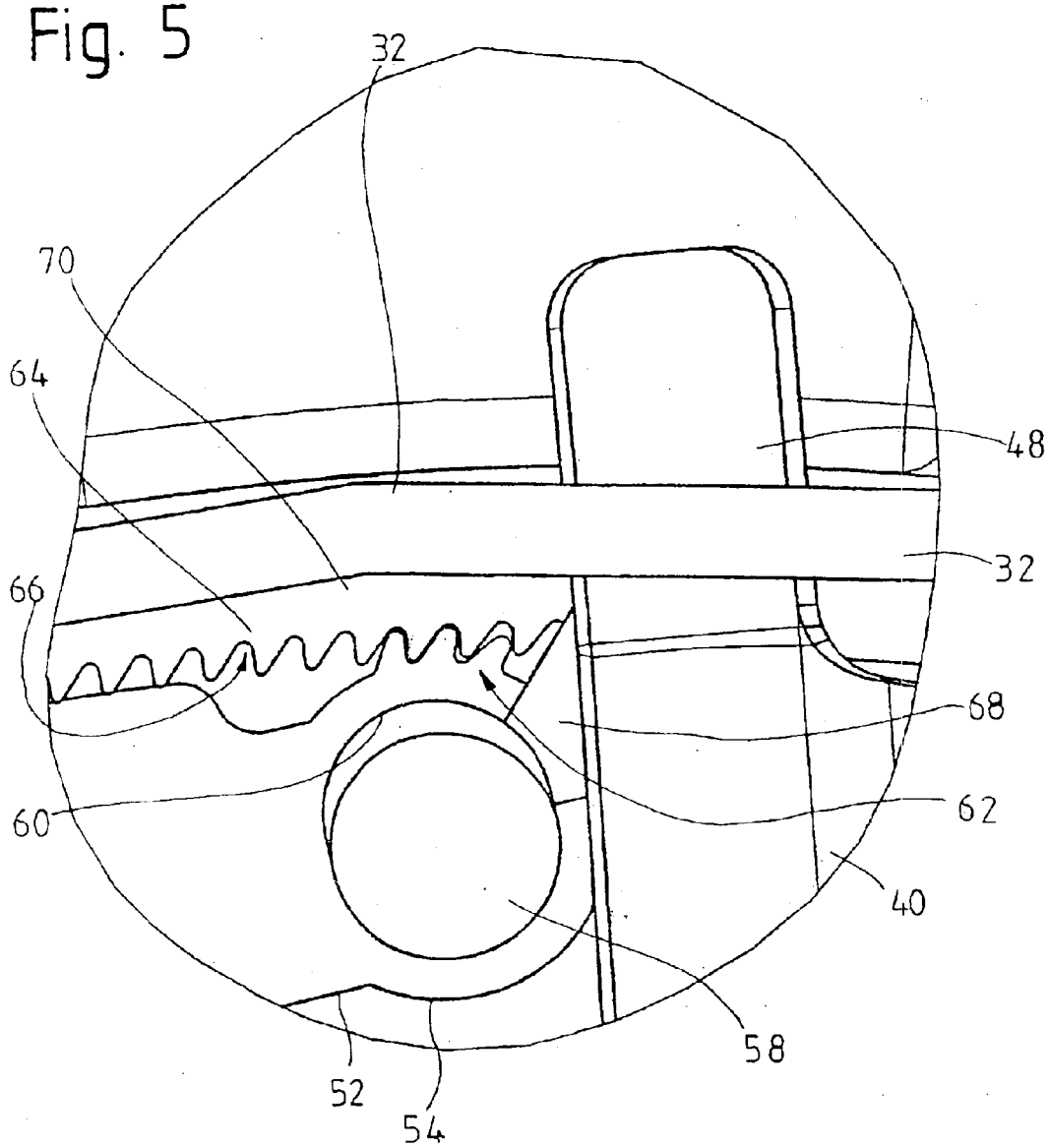
FIG. 5 shows an enlarged view of the detail contained within the circle V in FIG. 2.
Figure 6:
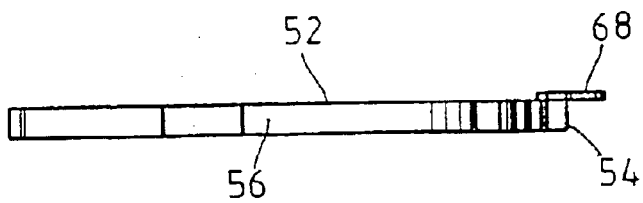
FIG. 6 shows a side view of an adjusting element.
Figure 7:
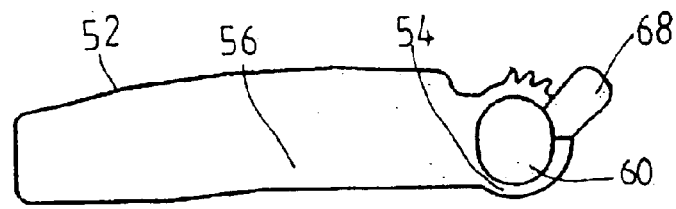
FIG. 7 shows a plan view of the adjusting element according to FIG. 6.
Figure 8:
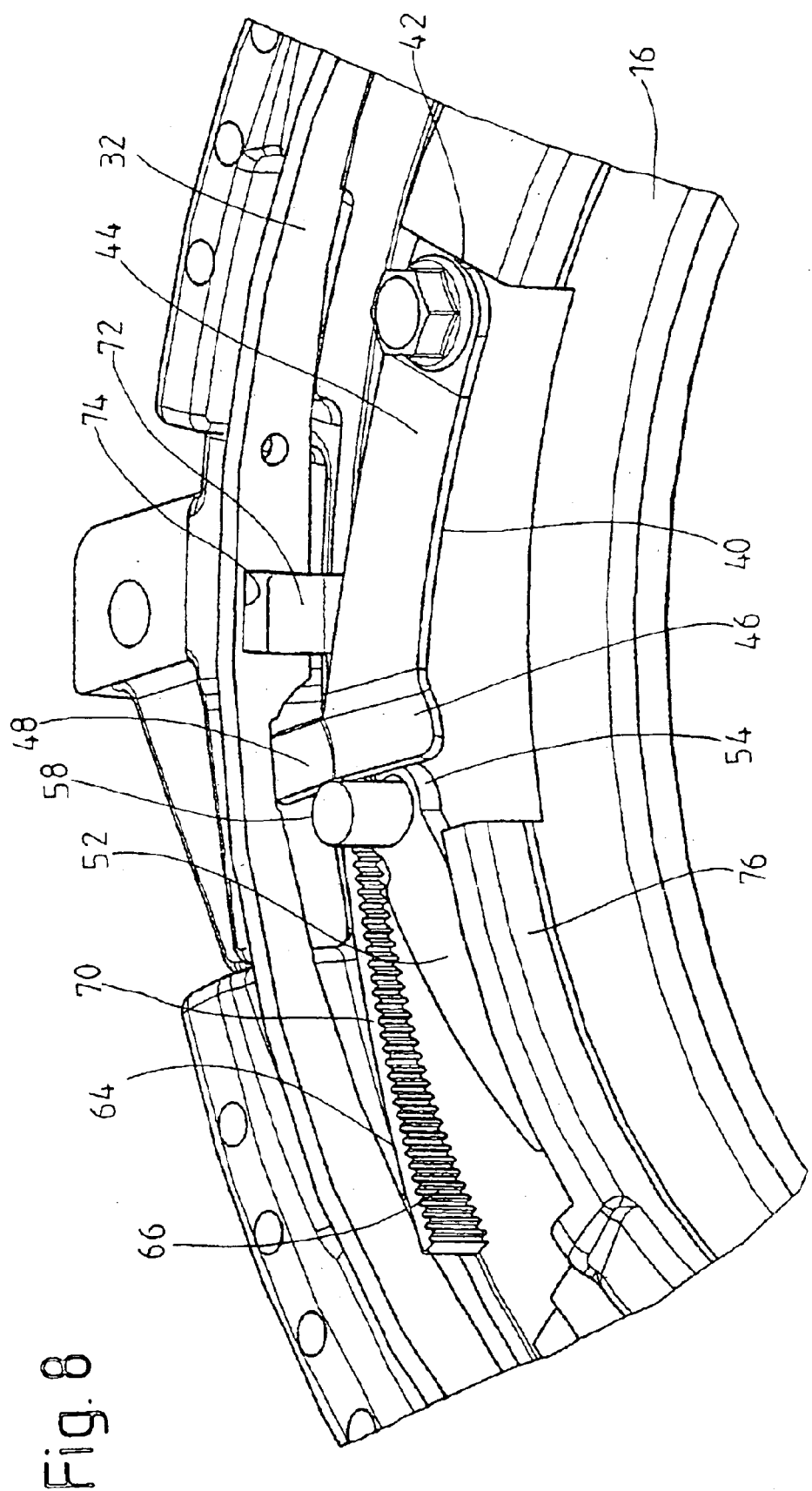
FIG. 8 is similar to FIG. 1 but shows the arrangement in a state in which it is ready to execute a wear-compensating process.
Figure 9:
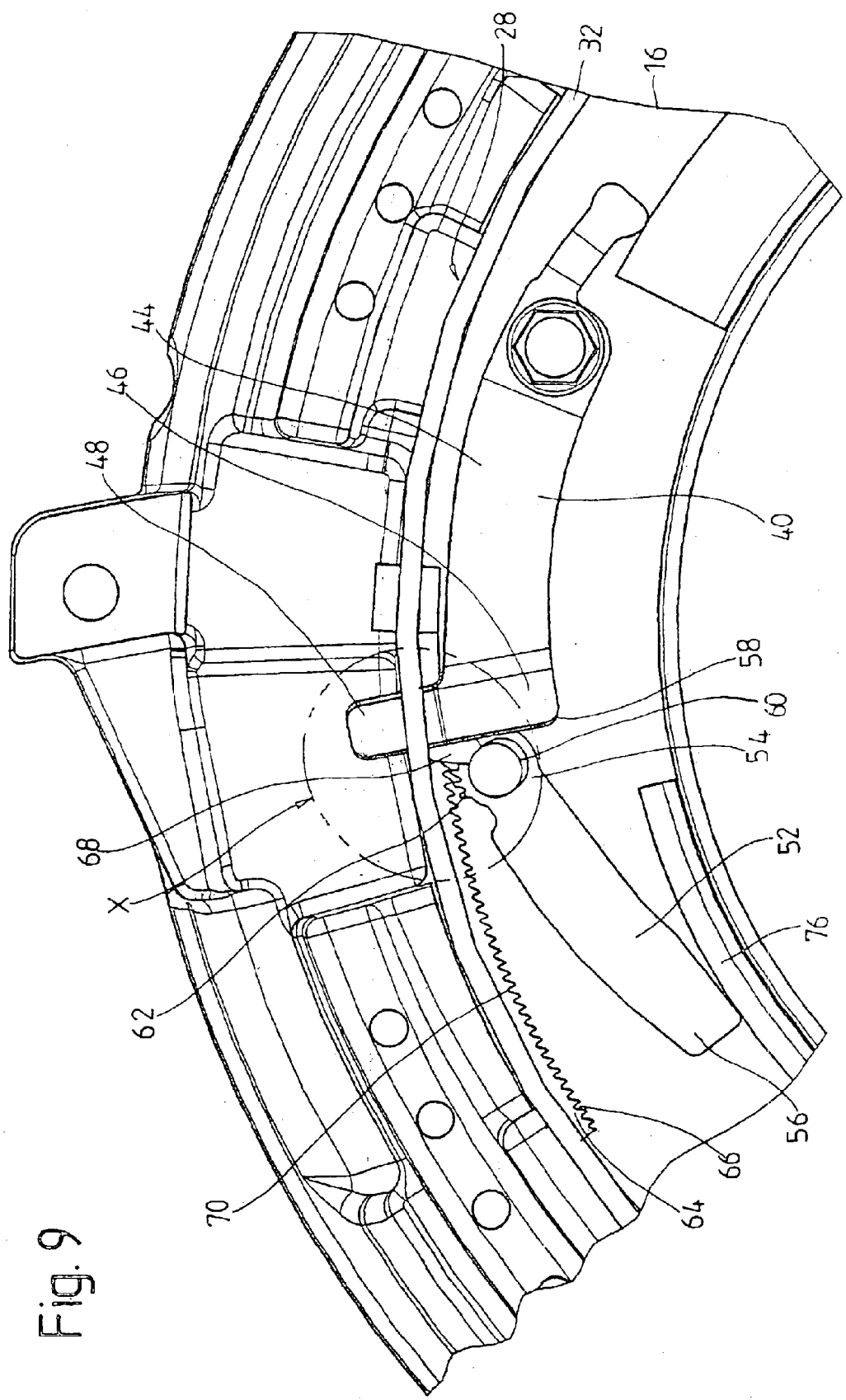
FIG. 9 shows an axial view of the arrangement according to FIG. 8.
Figure 10:
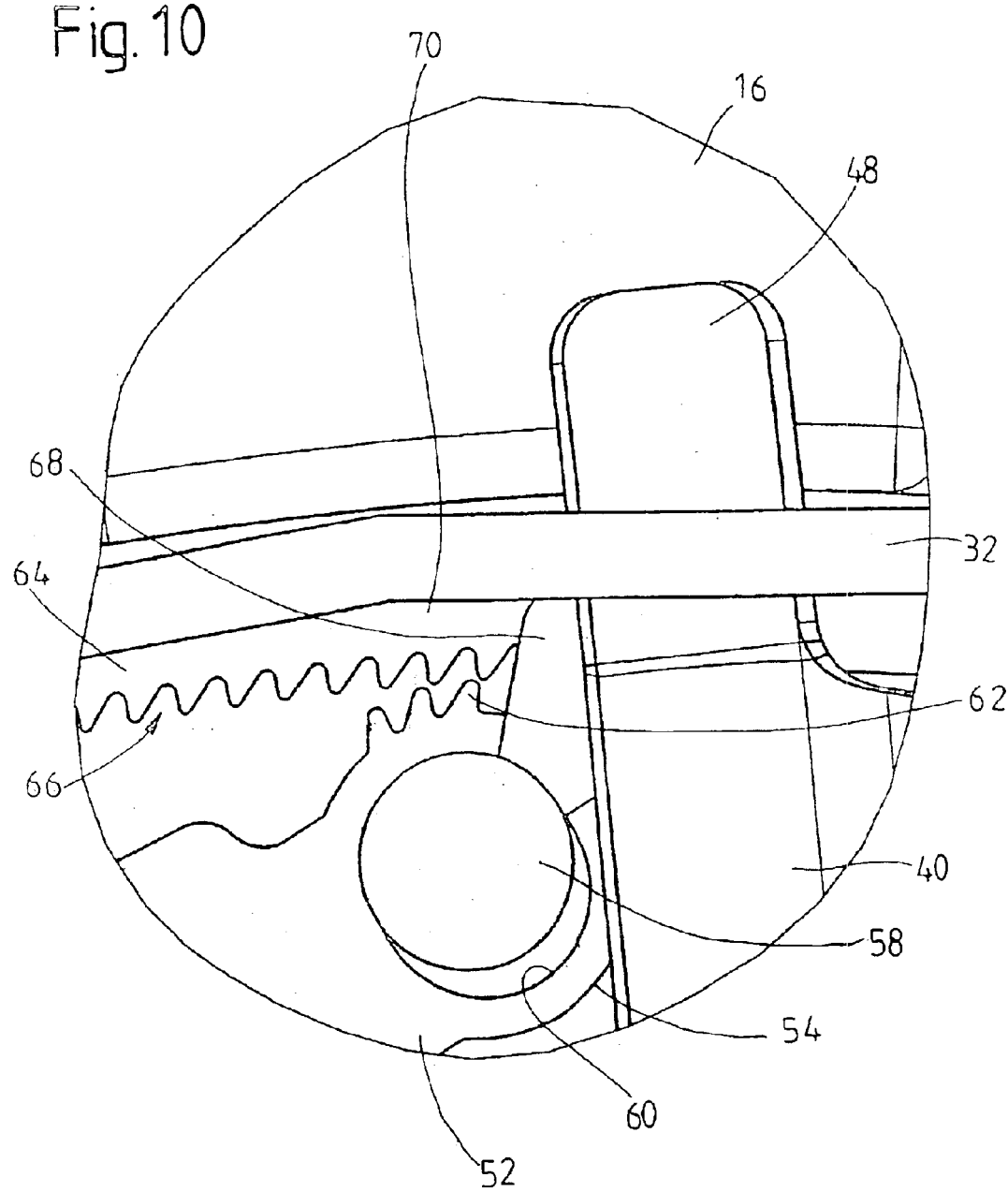
FIG. 10 shows an enlarged view of the detail present in the circle X in FIG. 9.

An adjusting element 52 is provided to work with the adjusting ring 32, as can be seen especially clearly in FIGS. 1 and 2. This adjusting element has a head-like support section 54 and a lever section 56, extending from the head in the circumferential direction. A bed bolt 58, extending essentially in the axial direction, is provided on the pressure plate 16; this bolt passes through a slot-like opening 60 in the support section 54 of the adjusting element 52. As can be seen in FIG. 2, this essentially oval opening extends more-or-less in the radial direction. As can be seen especially in the enlarged view of FIG. 5, there is a set of adjusting teeth 62 on the head-like support section 54. An opposing set of adjusting teeth 66 is provided on the inside surface of a wedge-like blocking element 64. In the first end position of the sliding movement of the adjusting element 52 relative to the bed bolt 58, this opposing set of teeth meshes with the set of adjusting teeth 62. When, starting from the first sliding end position shown in FIG. 5, the adjusting element 54 shifts to the second sliding end position shown in FIG. 10, the set of adjusting teeth 62 becomes disengaged from the opposing set of adjusting teeth 66.

An arresting projection 68 is also provided on the support section 54 of the adjusting element 52. This projection, as can be seen clearly in FIGS. 3 and 5, can be clamped between the more-or-less radially oriented detection section 48 of the wear detection element 40 and an axial end surface 70 of the sliding wedge-like blocking element 64. This blocking element 64, which extends along the inside surface of the adjusting ring 32 and passes under the detection section 48 of the wear detection element 40, also has a connecting section 72, which engages in an assigned connecting recess 74 in the adjusting ring 32 with essentially no freedom of motion in the circumferential direction, so that the blocking element 64 is connected to the adjusting ring 32 for rotation in common in the circumferential direction.

The way in which the pressure plate assembly 10 functions during the performance of a wear-compensating process is described below. It is to be assumed initially that, in FIGS. 1 and 5, a state is present in which no wear has occurred or in which compensation has already been made for wear which did occur. Thus, while the pressure plate assembly is rotating, the set of adjusting teeth 62 is engaged with the opposing set of adjusting teeth 66, because, as a result of the action of centrifugal force, the support section 54 of the adjusting element 62 is pretensioned into the first sliding end position. In addition, the lever section 56 is resting against the inside surface of the blocking element 64, that is, against the opposing set of adjusting teeth 66 of that element, so that no further pivoting is possible. The arresting projection 68, furthermore, is clamped between the blocking element 64 and the detection section 48 of the wear detection element 40. Primarily because of the meshing between the set of adjusting teeth 62 and the opposing set of adjusting teeth 66 and the fact that the adjusting element 52 cannot pivot any further, the blocking element 64 is prevented from moving in the circumferential direction, as a result of which the adjusting ring 32 is also prevented from moving in the circumferential direction. The wear detection element 40, which is resting under pretension on the blocking element 64, that is, by way of the intermediate support of the arresting projection 68, can also make a contribution to this blocking effect, although this force contribution is insignificant with respect to the prevention of the rotational movement of the adjusting ring 32. In this phase, the main contribution being made by the wear detection element 40 is to prevent the adjusting element 52 from moving from the first sliding end position (see FIG. 5) to the second sliding end position (see FIG. 10).

When wear now occurs, the detection section 48 remains hanging on the counter-detection element 50, as already described above. The end area 46 of the wear detection element 40 thus moves away from the pressure plate 16, which has the result of releasing the clamping effect being exerted on the arresting projection 68. Thus the adjusting element 52 is no longer arrested in the position shown by way of example in FIG. 5. Initially, however, while the assembly is rotating, the set of adjusting teeth 62 of the adjusting element 52 is still engaged with the opposing set of adjusting teeth 66, but it is held there by centrifugal force alone. Let it now be assumed that the vehicle comes to a stop and that the pressure plate assembly therefore comes to a standstill with its axis of rotation in a horizontal position, as it would be in the normal case. Let it also be assumed that the pressure plate assembly happens to be stopped in a rotational position in which the bed bolt 58 is positioned at the top or at least in the area above the axis of rotation. Because the previously mentioned clamping of the arresting projection 68 is no longer in effect, and also because there is no longer any centrifugal force in effect either, the adjusting element 62 is able to slide into the second end position shown in FIG. 10 and thus to disengage itself from the blocking element 62. As soon as the set of adjusting teeth 62 is no longer meshing with the opposing set of adjusting teeth 66, it is possible for the adjusting element 52, once it has reached the second sliding end position or while it is sliding into the second end position, to pivot around the bed bolt 58 under the effect of gravity and because of the presence of the lever section 56 on the adjusting element 52. The lever section 56 thus moves away from the inside surface of the blocking element 64 until it comes to rest against, for example, a stop 76 provided on the pressure plate 16. As can be seen easily in FIGS. 8 and 9, the adjusting element 52 is now in its second sliding end position and also in a pivot position in which it is prepared to perform an adjusting movement.

When rotational operation resumes, the adjusting element 52 will first move slightly outward in the radial direction under the action of centrifugal force, so that the support section 54 of the element will shift position on the bed bolt 58. This has the effect of reestablishing the meshing engagement between the set of adjusting teeth 62 and the opposing set of adjusting teeth 66. As soon as this meshing engagement is present, the adjusting element 52 can no longer shift radially; on the contrary, it will execute a pivoting movement under the action of centrifugal force, during which a transition occurs from the preparatory adjusting movement pivot position, shown by way of example in FIG. 9, to the adjusting movement end position shown by way of example in FIG. 2, in which the lever section 56 rests again against the inside surface of the blocking element 64. During this pivoting movement, the blocking element 64 is forced to move in the circumferential direction, as a result of which the adjusting ring 32 is also forced to move in the circumferential direction by way of this blocking element 64, which is acting here as an adjusting force-transmitting element, and thus the adjusting ring executes the previously described wear-compensating movement. Because the adjusting ring 32 is basically clamped between the pressure plate 16 and the force-storing device 22, this adjusting movement can occur only when there is no force being exerted by the force-storing device 22, that is, only when, for example, the pressure plate assembly 10 or a friction clutch with such an assembly is being held in a released condition or is being brought into a released condition.

It should be pointed out that the function described above can also be realized by other free-wheeling designs. For example, a detent pawl can be used, which, when it pivots radially inward by the force of gravity, for example, slides over a set of teeth and thus has no locking effect. When it pivots outward under the action of centrifugal force, however, it performs a locking function and pushes the adjusting ring 32 further along.

As this adjusting process is being performed, the longitudinal section of the wedge-like blocking element 64, which becomes gradually thicker, moves into the area between the pressure plate 16 and the detection section 48 of the wear detection element 40. If the previous wear has been compensated sufficiently, then, upon execution of this adjusting process, or at the end of the adjusting process, the arresting projection 68 on the adjusting element 52 is again clamped between the blocking element 64 and the detection element 40, so that the adjusting element 52 is again prevented from moving. If there has been only a small amount of wear, the clamping effect can occur even before the adjusting movement has brought the adjusting element into the end pivot position shown in FIG. 2. The adjusting element 52 cannot undergo any further movement in this state either. The adjusting element will not be able to move into the final pivot position of the adjusting movement shown in FIG. 2 until more wear has occurred and the arresting-clamping effect on the arresting projection 68 has been released again by the movement of the wear detection section 48 with respect to the pressure plate 16.

If the pivoting movement of the adjusting element 52 and the associated shifting movements of the blocking element 64 and of the adjusting ring 32 have not yet led to sufficient wear compensation, the arresting projection 68 will not yet be clamped between the blocking element 64 and the wear detection element 40 by the time the adjusting element reaches the end pivot position of the adjusting movement (see FIG. 2). This means that, when a state occurs again in which the pressure plate assembly 10 is not rotating around the axis of rotation A and the adjusting element 52 is positioned in the upper area, this element can move back again into the second sliding end position, in which the set of adjusting teeth 62 is disengaged from the opposing set of adjusting teeth 66 and the adjusting element 52 can move again into the preparatory adjusting movement pivot position shown by way of example in FIG. 9. After the assembly has started to rotate again, but the clutch is still disengaged, a new adjusting movement will occur, during the course of which the previously detected wear will or will not be sufficiently compensated; if it is not, the same procedure as that described above will be repeated.

It can be seen from the preceding description that, in the case of the pressure plate assembly 10 according to the invention shown in FIGS. 1–10, force is acting on the adjusting ring 32 only when in fact a wear take-up operation is supposed to take place. There is no permanent pretension. For this reason, it is not necessary for the wear detection element 40, for example, to apply a permanent opposing force, which serves to prevent an unwanted movement of the adjusting ring. Instead, the wear detection element 40 can provide a comparatively weak pretensioning force, so that its contact with the counter-detection element 50 does not have any negative effect on the operating characteristics of the clutch.

When the system is not rotating, the adjusting element 52 will be able to move from the first sliding end position to the second sliding end position upon the occurrence of wear, as previously mentioned, only when the bed bolt 58 and thus the adjusting element 52 are positioned in an area above the axis of rotation. The downward shift induced by gravity to the second sliding end position will occur when the bed bolt 58 is within a range of approximately ±60° relative to a perpendicular line intersecting the axis of rotation. This means that this shift will be able to occur in approximately 30% of the positions which the pressure plate assembly could occupy after it has stopped. The required wear compensation can thus take place after every third-to-fourth time the system stops. To ensure that, each time the system stops, the adjusting element 52 can move reliably into the second sliding end position after wear has occurred, a pretensioning spring can be provided, such as a leaf spring, a helical compression spring, or the like, which tries to push the adjusting element 52 into the second sliding end position and possibly also tries to push it into the preparatory adjusting movement pivot position.

An alternative design of the pressure plate assembly according to the invention is shown in FIGS. 11–14. Components which correspond to those previously described are designated by the same reference numbers.

It can be seen, first, that, here too, the support section 54 of the adjusting element 52 is supported with freedom to pivot in the previously described manner on a bed bolt 58 provided on the pressure plate 16. The adjusting element 52 again has a set of adjusting teeth 62 on this support section 54. The opposing set of adjusting teeth 66 is provided on the inside surface of the adjusting ring 32, either as an integral part thereof or on a separate part which is then attached to the ring. The arresting projection 68 is again provided on the support section 54 of the adjusting element 52; this projection can now be clamped between an end surface 80 of the section 82 on which the set of teeth 66 is provided, this being the surface which faces the pressure plate 16, and the end area 46 of the wear detection element 40 which radially overlaps this section 82. A bolt 84 provided on the force-storing device 22 now forms the counter-detection element 50, which works together with the detection section 48 provided radially inside the adjusting ring 32 in the end area 46 of the wear detection element 40. This therefore means that, in the design variant shown in FIGS. 11–14, the wear detection element 40 no longer extends radially across the adjusting ring 32.

Figure 11:
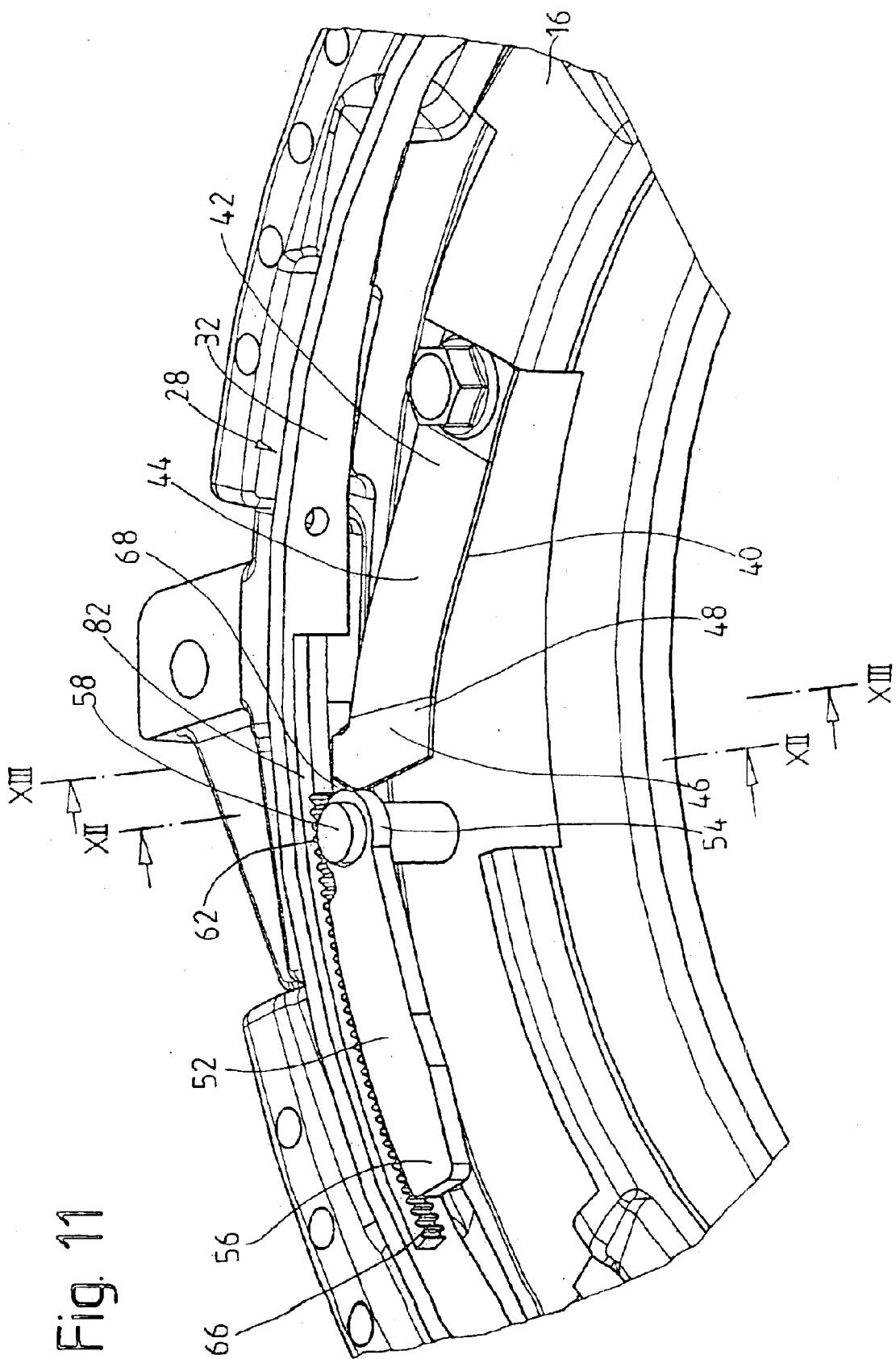
FIG. 11 is similar FIG. 1 but shows an alternative embodiment.
Figure 12:
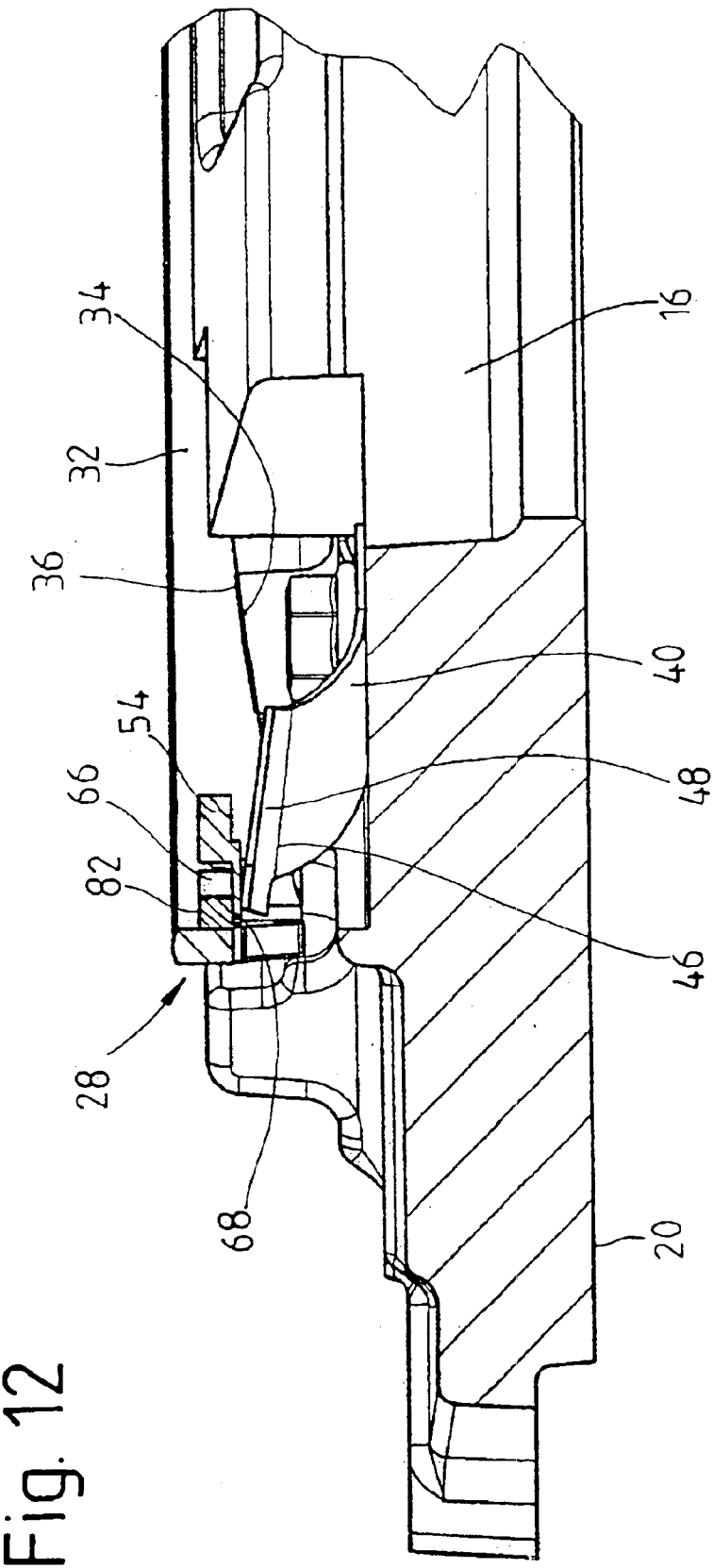
FIG. 12 shows a cross-sectional view of the arrangement according to FIG. 11 taken along line XII—XII.
Figure 13:
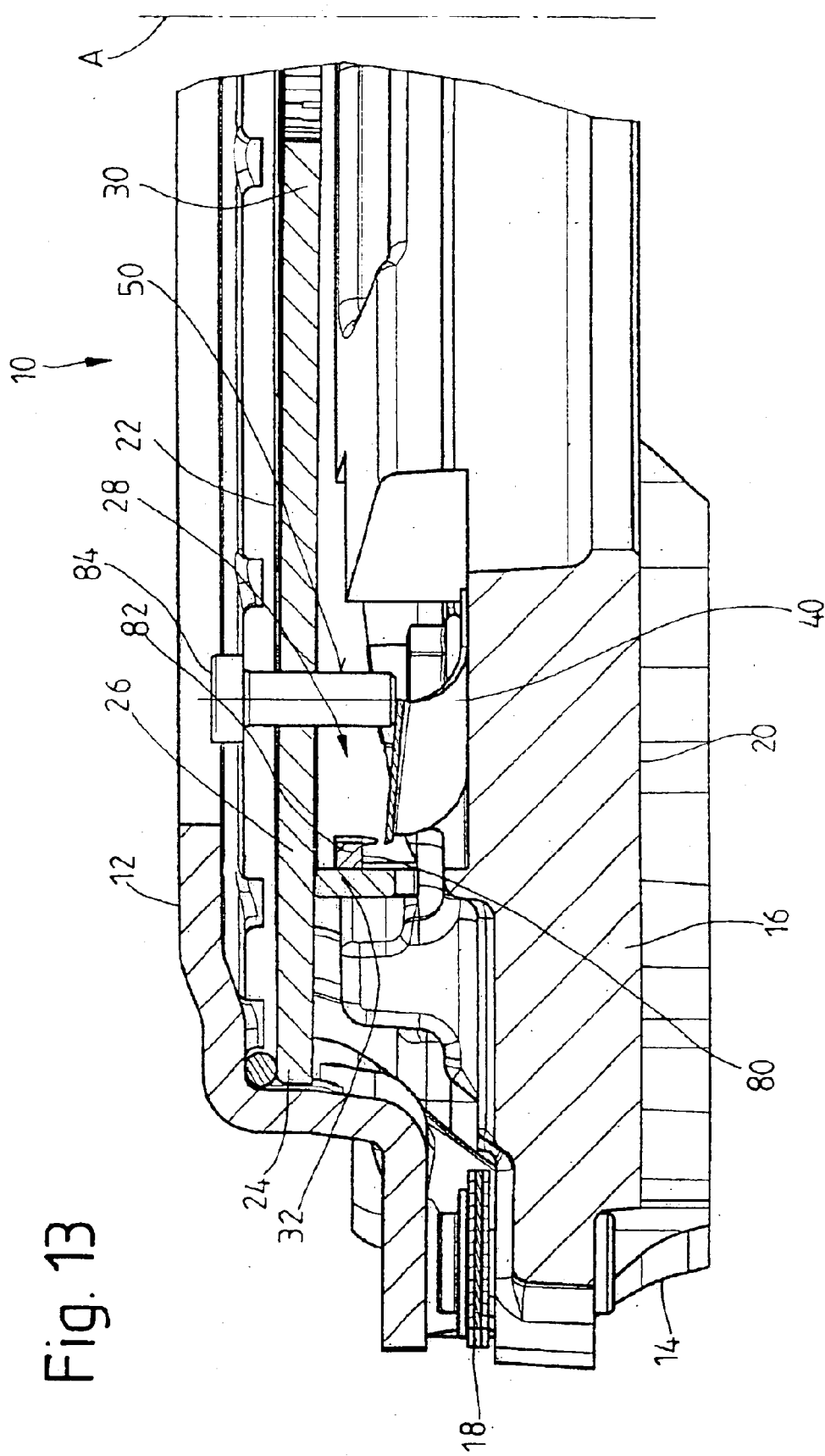
FIG. 13 shows a cross-sectional view of a pressure plate with an arrangement according to FIG. 11, taken along the line XIII—XIII in FIG. 11.
Figure 14:
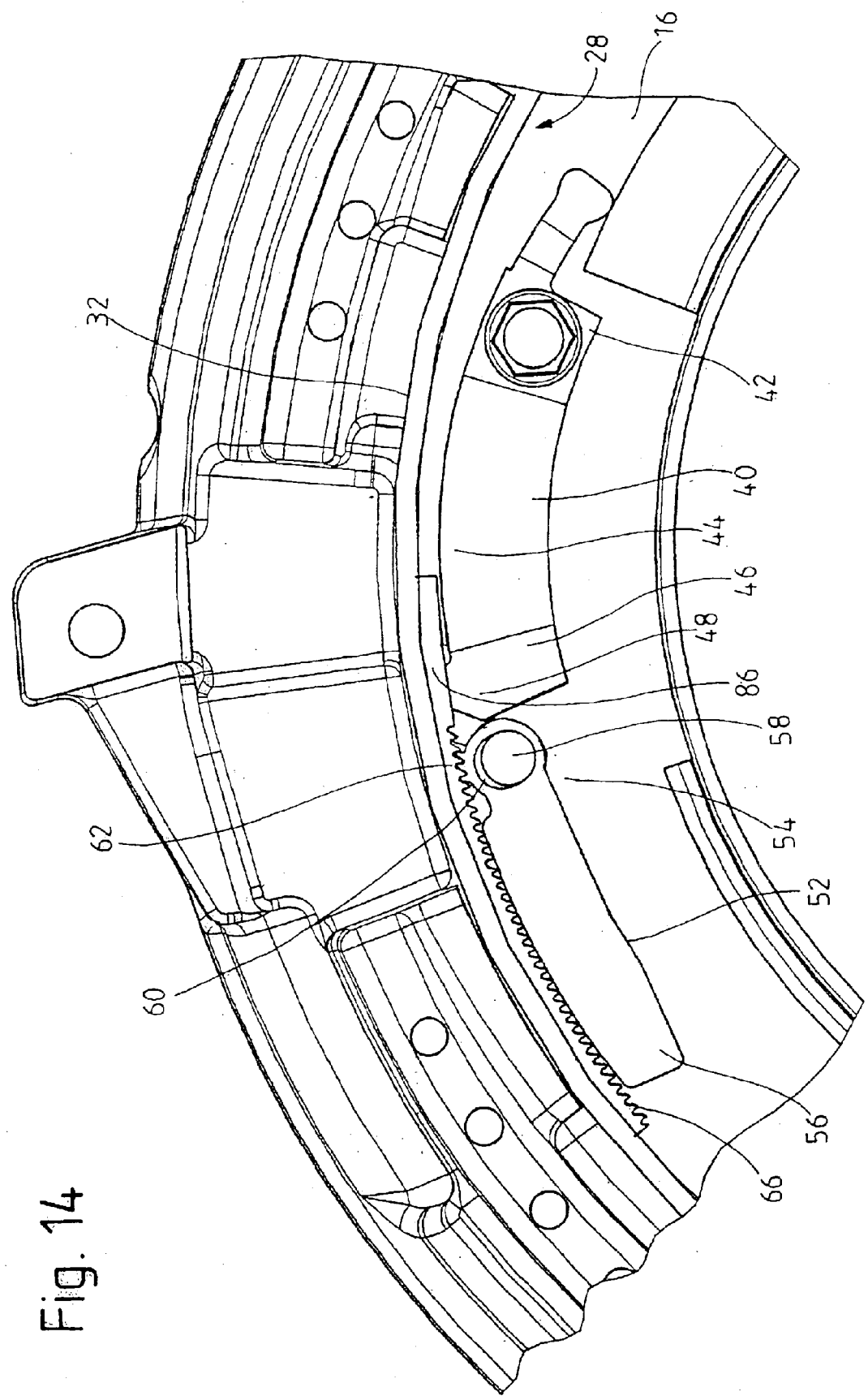
FIG. 14 shows an axial view of the arrangement shown in FIG. 11.

FIG. 11 shows the state assumed by this pressure plate assembly before any wear has occurred or after compensation for previous wear has taken place. The adjusting element 52 is prevented from pivoting and from sliding by the clamping effect exerted on the arresting section 68 between the end area 46 of the wear detection element 40 and the section 82. The set of adjusting teeth 62 is meshing with the opposing set of adjusting teeth 66, so that, as a result of the contact of the lever section 56 against the set of adjusting teeth 66, i.e., the section 82 carrying these teeth, the adjusting ring 32 is also prevented from rotating and thus from executing a wear take-up movement. Because the lever section 56 is pretensioned in the radially outward direction by centrifugal force, the adjusting ring 32 is also prevented from turning in the opposite direction; this effect is reinforced by the friction between the ramp surfaces 34 and the opposing ramp surfaces 36.

When wear occurs in this system, the force-storing device 22 shifts its position in correspondence with the axial movement of the pressure plate 16, its radially inner area thus moving toward the pressure plate. As this is happening, the bolt 84 comes to rest against the detection section 48 of the wear detection element 40 and presses the end area 46 of the detection element toward the pressure plate 16. Thus the wear detection element 40 releases the arresting projection 68 of the adjusting element 52. When the system comes to a stop again, the adjusting element 52, which is no longer arrested, can move by the force of gravity back into its second sliding end position, i.e., into the preparatory adjusting movement pivot position.

When the system starts to rotate again, the adjusting element 52 will again move under the effect of centrifugal force back into the first sliding end position and will then execute a pivoting movement, during which, as a result of the meshing of the sets of teeth 62, 66, the adjusting ring 32 is forced to execute an adjusting movement. Because this transition to the first sliding end position and then the pivoting to, for example, the pivoting movement end pivot position can occur only if the arresting projection 68 is not being clamped between the wear take-up element 40 and the section 82, this transition will occur only when the bolt 84 is acting on the detection element 40 in such a way that this element cannot generate the clamping effect just mentioned. This will be a state in which, during the clutch-engaging process, the force-storing device 22 is still not exerting so much force on the adjusting ring 32 that the ring cannot be rotated in the circumferential direction, or it will be a state in which, during a clutch-release process, the force acting on the adjusting ring 32 has already been reduced to a certain extent, but the bolt 84 is still so close to the pressure plate 16 that it can move the wear detection element 40 sufficiently far away from the section 82.

It should be pointed out that, in the embodiment shown in FIGS. 11–14, the adjusting element 52 can also be pretensioned by a spring arrangement in the direction toward the second sliding end position, i.e., to the preparatory adjusting movement pivot position.

In the embodiments described above, the adjusting element of the wear take-up device is the adjusting ring 32, which can slide over assigned opposing ramp surfaces on the pressure plate 16. It is also possible to provide two adjusting rings, one of which is supported on the pressure plate 16, whereas the other is subjected to the action of the force-storing device 22. In this case the ramp surfaces and their opposing ramp surfaces are provided on the facing edges of the two rings. One of the rings can be installed so that it cannot rotate, whereas the other ring executes the previously described wear take-up movement. It is also possible to replace the closed ring, which can be actuated by a single adjusting element 52, with individual sliders, in which case a separate adjusting element 52 would have to be provided for each slider.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A pressure plate assembly for a friction clutch, comprising:
   a housing;
   a pressure plate which can rotate with said housing about an axis of rotation;
   a force-exerting arrangement supported against said housing and exerting a force on said pressure plate along a path of force transmission;
   a wear take-up element in said path of force transmission, said wear take-up element being movable to compensate for wear of said friction clutch; and
   an adjusting element which can move to cause said wear take-up element to move in order to compensate for wear, said adjusting element moving in response to centrifugal force on said adjusting element.

2. A pressure plate assembly as in claim 1 further comprising adjusting teeth assigned to said wear take-up element for movement with said wear-take up element, said adjusting element comprising adjusting teeth which engage said adjusting teeth assigned to said wear take-up element in order to cause said wear take-up element to move.

3. A pressure plate assembly as in claim 2 wherein said adjusting teeth of said adjusting element can disengage said adjusting teeth of said wear take-up element.

4. A pressure plate assembly as in claim 3 wherein said adjusting element is supported on said pressure plate with freedom to slide and pivot relative to said pressure plate.

5. A pressure plate assembly as in claim 4 said adjusting teeth of said adjusting element engage said adjusting teeth of said wear take-up element in a first end position of sliding movement, and said adjusting teeth of said adjusting element disengage said adjusting teeth of said wear take-up element in a second position of sliding movement.

6. A pressure plate assembly as in claim 5 wherein said adjusting element moves from said first end position to said second end position by at least one of gravity and a pretensioning force of a spring.

7. A pressure plate assembly as in claim 5 further comprising an arresting device which allows the adjusting element to move from the first end position to the second end position only after wear has occurred.

8. A pressure plate assembly as in claim 7 wherein said arresting device comprises an arresting section on said adjusting element and a clamping arrangement which releases said arresting section when wear occurs and which clamps the arresting section to arrest the adjusting element in the first end position in the absence of wear and after a wear compensation movement of said wear take-up element.

9. A pressure plate assembly as in claim 5 wherein said adjusting element can be brought by centrifugal force from said second end position to said first end position.

10. A pressure plate assembly as in claim 5 wherein said adjusting element is pivoted into position for adjusting movement after reaching or while moving into said second end position.

11. A pressure plate assembly as in claim 10 wherein said adjusting element is pivoted into position for adjusting movement by at least one of gravity and a pretensioning force of a spring.

12. A pressure plate assembly as in claim 10 wherein said adjusting element can be pivoted by centrifugal force from said position for adjusting movement to said first end position.

13. A pressure plate assembly as in claim 1 further comprising a wear detection element on said pressure plate, said wear detection element having certain areas which shift position relative to said pressure plate upon occurrence of wear.

14. A pressure plate assembly as in claim 8 wherein said clamping arrangement comprises a wear detection element on said pressure plate, said wear detection element having certain areas which shift position relative to said pressure plate upon occurrence of wear.

15. A pressure plate assembly as in claim 13 further comprising a blocking element which prevents backward movement of said wear detection element relative to the pressure plate after the occurrence of wear and the shifting in position of said certain areas of said wear detection element relative to said pressure plate.

16. A pressure plate assembly as in claim 15 wherein said blocking element comprises a wedge-shaped blocking slider.

17. A pressure plate assembly as in claim 15 further comprising an adjusting force-transmitting element connected to said wear take-up element and having adjusting teeth, said adjusting element comprising adjusting teeth which engage said adjusting teeth on said force transmitting element in order to cause said wear take-up element to move, said adjusting force transmitting element comprising said blocking element.

18. A pressure plate assembly as in claim 13 wherein said housing comprises a counter-detection area, said wear detection element detecting occurrence of wear by interaction with said counter-detection area.

19. A pressure plate assembly as in claim 13 wherein said force-exerting arrangement comprises a counter-detection area, said wear detection element detecting occurrence of wear by interaction with said counter-detection area.

\* \* \* \* \*